United States Patent Office 3,573,946
Patented Apr. 6, 1971

3,573,946
PIGMENT COMPOSITIONS
Karlheinz Wolf, Cologne-Stammheim, Volker Aign, Langenfeld, Reinhold Hornle, Cologne-Flittard, and Artur Haus, Leverkusen, Germany, assignors to Farbenfabriken Bayer Aktiengesellschaft, Leverkusen, Germany
No Drawing. Filed Sept. 29, 1967, Ser. No. 671,555
Claims priority, application Germany, Oct. 1, 1966, F 50,343; Feb. 1, 1967, F 51,412
Int. Cl. C09c 3/02
U.S. Cl. 106—308
19 Claims

ABSTRACT OF THE DISCLOSURE

Organic or inorganic pigments are treated by contact in the dry or dispersed form, with cycloaliphatic amine, preferably at elevated temperatures. Optionally, the treated pigments are then acidified. Treated pigments exhibit good dispersibility and high tinctorial strength.

---

The present invention relates to a new and improved process for producing pigment compositions.

In order to obtain a high tinctorial strength, pigment dyes must be present in organic media, in particular in printing inks, lacquers and varnishes, but also in aqueous media as finely dispersed as possible.

In the production of pigment dyes from an aqueous solution, the pigment dyes in many cases are initially obtained in a finely dispersed state. After filtering off with suction and drying however very solid agglomerates result, which prior to their further processing must be ground in an aqueous or in an organic medium in order to obtain a high tinctorial strength of the pigment compositions. Grinding by means of conventional grinding equipments such as hopper mills or ball mills, requires much time and energy. Besides, it is not possible to grind all pigment dyes so as to obtain a sufficiently high state of subdivision associated with high glazing and good flowing properties.

Pigment dyes of the azo series having a soft grain may be obtained by producing them from their compounds in the presence of paraffin oils in combination with surface-active substances as emulsifiers. Besides, German published application 1,173,601 describes the production of pigment dyes of the azo series having a particularly high tinctorial strength by a process wherein surface-active salts of primary fatty amines with carboxylic acids are added during the coupling process. Finally, French Pat. 1,428,172 describes the production of readily dispersible pigments by adding long-chain aliphatic amines to the pigments wetted with water and subsequently drying. However, this method frequently involves shade changes, there is the further drawback that the pigments obtained are, for the most part, easily dispersible in organic media only.

In accordance with the present invention it has now been found that pigments are produced which can be dispersed very readily and in a very finely divided state in both organic and aqueous media by adding to the aqueous pigment dispersion or, in the case of pigment dyes of the azo series, to the coupling mixture primary or secondary cycloaliphatic amines of the general formula $$R—NH—R_1 \quad (I)$$

wherein R stands for a 5–6 membered, optionally substituted cycloaliphatic radical and $R_1$ represents hydrogen, a 5–6-membered, optionally substituted cycloaliphatic radical or an alkyl group with 2–4 carbon atoms, which may be substituted by a $NH_2$-group, or salts thereof and, if the mixture does not react alkaline, rendering the mixture alkaline so that the amine is converted into the free form, subsequently isolating the pigment dyes optionally after stirring and heating the mixture for a prolonged period of time to elevated temperatures, preferably to temperatures between 50 and 100° C., in usual manner by filtering off with suction and optionally washing with water and drying.

The herein described process can be modified in such a manner that the amine treatment in an alkaline medium, optionally after heating and stirring the mixture for a prolonged period of time, is followed by acidification and, optionally after further stirring and heating of the mixture, the pigment dyes are isolated in usual manner by filtering off with suction and optionally washing neutral with water and subsequently dried.

The production of the pigment compositions according to the present invention can also be accomplished in such a manner that dry pigment dyes are treated with the above said amines, optionally at elevated temperatures, preferably 50–100° C., subsequently filtered off with suction and optionally washed with water, or the treatment with the above said amines is followed by treatment with water, the mixture is then rendered acid and, optionally after stirring and heating for a prolonged period of time, the pigment dyestuffs are isolated in usual manner by filtering off with suction and optionally washing with water until neutral and subsequently dried.

Suitable pigment dyes for the process according to the invention include organic pigments, e.g. pigment dyes of the azo series, color lakes (laked dyestuffs) (cf. Ullmanns Encyklopädie der technischen Chemie, vol. 13, pages 806 and 808 (1962)), complex pigment dyes (cf. Ullmanns Encyklopädie der technischen Chemie, vol. 13, page 806 and 808 (1962)), complex pigment dyes (cf. Encyklopädie der technischen Chemie vol. 3, page 696 (1953)), phthalocyanine pigment dyes and quinacridone pigments as well as inorganic pigments, e.g. titanium dioxide, iron, cadmium, chromium and zinc pigments, as well as carbon black.

Examples of suitable amines of the general Formula I are cyclohexylamine, hexahydroaminotoluene, N-cyclohexylpropylenediamine-1,3), dicyclohexylamine, as well as the diamine of the formula

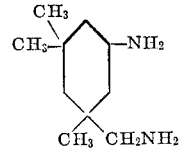

Suitable salts are in particular those of strong inorganic acids, such as HCl, HBr, $H_2SO_4$, $H_3PO_4$ as well as organic acids, e.g. carboxylic acids or sulfonic acids.

The amines or the salts thereof are used in quantities of about 1–500 percent by weight related to the pigment dyes; when using dry pigment dyes, preferably 10–500 percent by weight of amine are used and, when using aqueous pigment dispersions, preferably 10–50 percent by weight of amine or amine salts are used.

The free amines can be used in substance, in an organic solution or in form of an aqueous emulsion.

The alkaline mixtures can be rendered acid with organic as well as with inorganic acids. Preference is given to low aliphatic carboxylic acids such as acetic acid.

The pigment compositions can be produced in the presence of known auxiliaries, e.g. anionic, cationic or nonionic dispersion agents, in an aqueous solution or dispersion or in organic solvents. As examples there may be mentioned long-chain alkyl- and alkyl-aryl-sulfonates, pyridinium salts, dispersion agents on the basis of ethylene oxide and propylene oxide and carboxylic acid esters of polyglycols.

The pigment compositions obtained according to the invention are produced by mixing an aqueous dispersion of the pigment dyes with a free amine or a salt thereof, optionally with stirring, rendering the mixture alkaline if the mixture does not react alkaline, optionally heating the mixture for some time with stirring, then optionally acidifying the mixture and optionally further stirring the mixture while heating and isolating the pigment dyes in known manner by suction-filtering and optionally drying.

The production of the pigment compositions from dry pigment dyes is accomplished in such a manner that the pigment dye is kneaded or ground in a ball mill or in a dispersion kneader with about 10–150 percent by weight, preferably 50–100 percent by weight, of the above said amines, optionally in the presence of conventional grinding auxiliaries such as inorganic salts, or the pigment dyes are stirred with about 100–500 percent by weight of an amine, optionally heated to elevated temperatures, preferably to temperatures of 80–100° C., and then suction filtered and optionally treated with water; the process of producing the pigment compositions according to the invention can be modified so that the treatment with the amine is followed by stirring with water, acidification with the above said acids, optionally heating to elevated temperatures, preferably to temperatures of 80–100° C., preferably at pH 4–5, and subsequently filtering off the pigment with suction, washing neutral with water and drying.

In the production of pigment compositions from pigment dyes of the azo series the amines or the salts thereof are advantageously added to the diazo and azo components before or during coupling or, if coupling is effected under alkaline conditions, the amines or the salts thereof are preferably added to the coupling components dissolved in an alkaline medium. If coupling is effected under acidic conditions, the acid solution of the amine is added to the solution or suspension of the diazo component, or the coupling component dissolved in an alkaline medium is precipitated with an acid solution of the amine and subsequently coupled. According to another embodiment of the invention the amine is added together with the diazo component, which is dissolved or dispersed in an acid medium, to the solution or dispersion of the coupling component.

In the above described processes the amine must be present in a free form before isolating the pigment dyestuff, i.e. the coupling mixture must be rendered alkaline after coupling at the latest. In many cases it is of advantage to heat the mixture for some hours under alkaline conditions.

The present invention is further illustrated by the following examples without being restricted thereto.

EXAMPLE 1

400 g. of the yellow pigment dyestuff No. 20045 (Colour Index, second edition, 1956) are stirred with 80 g. of N-cyclohexyl-propylene-diamine-(1,3) and about 1500 ml. of water and then heated to boiling. The mixture is filtered off with suction while hot and the residue is washed with hot water. The pigment composition obtained is either dried at 50° C. or used in form of the undried press cake for the preparation of aqueous pigment dispersions.

Thus, e.g. an aqueous pigment dispersion is obtained for the spin-dyeing of viscose by treating the pigment press cake with dinaphthaylmethane sulfonate as dispersion agent, adjusting the pigment concentration with water to 20 percent and grinding the mixture by means of one of the customary wet grinding equipments. As compared with the pigment dispersions prepared without the addition of N-cyclohexyl-propylenediamine-(1,3), the dispersion prepared as described above shows the advantage that the fine subdivision of the pigment is substantially improved and that, furthermore, the paste is not thixotropic and shows practically no tendency to foam.

EXAMPLE 2

The red pigments Nos. 12490 and 12310 (Colour Index, second edition, 1956) as well as the pigment obtainable by diazotizing 3 - amino - 4 - methoxy-6-benzoylamino-1-methyl-benzene and coupling with 2-hydroxynaphthoic acid-(3)-(p-chloro-anilide) are treated as described in Example 1. Aqueous pigment dispersions prepared with the pigment compositions thus obtained with the addition of dispersion agents can be used in the spin-dyeing of viscose or for dispersion paints. They are distinguished by a very good fine dispersion of the pigment and do not exhiibt any thixotropic properties.

EXAMPLE 3

320 g. of 3,3'-dichloro-4,4'-diamino-diphenyl are stirred with about 2500 ml. of water and 525 ml. of hydrochloric acid (19.5° Bé.) and diazotized with 613 ml. of a sodium nitrite solution (30 percent by volume) at 0–5° C. 460 g. of acetoacetic acid anilide are dissolved in 4500 ml. of water and 341 ml. of a sodium hydroxide solution (40 percent by volume) at 30° C., and an aqueous solution of 440 g. of sodium benzoate is added. By adding a solution consisting of 175 g. of N-cyclohexyl-propylenediamine-(1,3), 415 ml. of glacial acetic acid and 500 ml. of water, the acetoacetic acid anilide is precipitated at a temperature of 5–10° C. A solution of a diazotized 3,3'-dichloro-4,4'-diamino-diphenyl is slowly added dropwise to the above mixture. After completion of the coupling, the mixture is heated to 80–90° C. and adjusted to pH 11 with about 1000 ml. of a sodium hydroxide solution (40 percent by volume). After heating to 80–90° C. for 5 hours the mixture is filtered off with suction, the residue washed with water and dried at 40° C.

The pigment composition thus obtained can be used in the production of a printing ink as follows:

5 parts of the pigment composition are ground in a ball mill with a solution of 20 parts of chlorinated rubber of medium viscosity, 60 parts of toluene and 20 parts of xylene.

As compared with the printing ink prepared from an untreated pigment, the printing ink obtained as described above exhibits substantially improved flowing and glazing properties and shows a substantially improved depth of color.

When using hexahydro-4-aminotoluene or cyclohexylamine instead of N-cyclohexyl-propylenediamine-(1,3) there are likewise obtained pigment compositions which yield printing inks of good flowing and glazing properties.

EXAMPLE 4

18.4 g. of 3,3'-dichloro-4,4'-diamino-diphenyl are stirred with 200 ml. of water and 30 ml. of hydrochloric acid (19.5 Bé.) and diazotized with 35 ml. of a sodium nitrite solution (30 percent by volume) at 0–5° C. 30 g. of acetoacetic acid-2,4-xylidide are dissolved in 300 ml. of water and 19.5 ml. of a sodium hydroxide solution (40 percent by volume) at 30° C. and this mixture is added to a solution of 0–5° C. consisting of 10 g. of N-cyclohexyl-propylenediamine-(1,3), 30 g. of sodium acetate, 25 ml. of glacial acetic acid and about 300 ml. of water.

The solution of diazotized 3,3'-dichloro-4,4'-diamino-diphenyl is slowly run into the above mixture. After completion of the coupling the mixture is heated to 80–90° C. and adjusted to pH 11 by means of a sodium hydroxide solution. After heating to 80–90° C. the mixture is filtered off with suction, the residue washed with water and then dried at 50° C.

The printing ink which is prepared as described in Example 3 shows a high tinctorial strength and good glazing properties.

EXAMPLE 5

In the production of the pigment compositions described in Example 4, N-cyclohexyl-propylene-diamine-(1,3) can be replaced by 10 g. of dicyclohexylamine.

The pigment composition thus obtained can be used e.g. in producing book and offset printing inks which are distinguished by a good tinctorial strength and very good flowing properties.

EXAMPLE 6

50 g. of the copper phthalocyanine of the β-modification are stirred with 200 ml. of N-cyclohexyl-propylene-diamine-(1,3) and heated to 70–90° C. while stirring for 4 hours. The mixture is poured into 400 ml. of water, adjusted to pH 4–5 with acetic acid and heated to 80–90° C. for 2 hours. The pigment preparation is subsequently filtered off with suction, washed neutral with water and dried at 50° C.

The pigment composition thus obtained can be used in producing a printing ink as follows:

5 parts of the pigment composition are ground in a ball mill with a solution of 20 parts of chlorinated rubber of medium viscosity, 60 parts of toluene and 20 parts of xylene.

As compared with the printing ink prepared from an untreated pigment, the printing ink obtained as described above shows a substantially improved tinctorial strength.

EXAMPLE 7

50 g. of the copper phthalocyanine of the β-modification are ground in a ball mill for 12 hours with 50 ml. of N-cyclohexyl-propylenediamine-(1,3). The paste is stirred with 400 ml. of water, adjusted to pH 4–5 with acetic acid and heated to 80–90° C. for 2 hours. The pigment preparation is subsequently filtered off with suction, washed neutral with water and dried at 50° C.

The pigment composition thus obtained shows an essentially improved tinctorial strength as compared with an untreated pigment.

EXAMPLE 8

50 g. of the copper phthalocyanine of the β-modification are kneaded in a dispersion kneader with 50 ml. of N-cyclohexyl-propylenediamine-(1,3). The paste is then further processed as described in Example 7.

EXAMPLE 9

50 g. of the copper phthalocyanine of the β-modification are boiled under reflux with stirring for 3 hours with a solution of 10 g. of N-cyclohexyl-propylenediamine-(1,3) in 150 ml. of acetone. The acetone is then distilled off, the residue stirred with water and adjusted to pH 4–5 with acetic acid. After heating to 80–90° C. for 2 hours the pigment composition is filtered off with suction, washed neutral with water and dried at 40° C. The pigment composition can be used to prepare a printing ink as described in Example 6.

What is claimed is:

1. Process for treating pigments comprising (1) contacting said pigments at a temperature of 50 to 100° C. with 1 to 500 weight percent based on said pigments, of free amine having the formula $$R-NH-R_1$$

wherein R is an unsubstituted 5–6 membered cycloaliphatic radical 3 or a 5–6 membered cycloaliphatic radical substituted with methyl or methyleneamino; $R_1$ is hydrogen, a 5–6 membered unsubstituted cycloaliphatic radical, an alkyl group with 2–4 carbon atoms, or an alkyl group with 2–4 carbon atoms substituted by an NH$_2$-group; and (2) isolating the pigments.

2. Process of claim 1 wherein the treatment with the amine is carried out while stirring.

3. Process of claim 1 wherein the pigment is in an aqueous alkaline dispersion in which it was prepared.

4. Process of claim 3 wherein the pigment is an azo dye.

5. Process of claim 1 wherein pigments are subjected to the step (1) of contact with amine, then the mixture is acidified prior to the isolation step (2).

6. Process of claim 1 wherein the amine is N-cyclohexylpropylenediamine-(1,3).

7. Pigment prepared by the process of claim 1.

8. Process for treating organic pigments comprising (1) contacting said pigments with 1 to 500 weight percent based on said pigments, of a free amine having the formula $$R-NH-R_1$$

wherein R is an unsubstituted 5–6 membered cycloaliphatic radical, or a 5–6 membered cycloaliphatic radical substituted with methyl or methylene-amino; $R_1$ is hydrogen, a 5–6 membered unsubstituted cycloaliphatic radical, an alkyl group with 2–4 carbon atoms, or an alkyl group with 2–4 carbon atoms substituted by an NH$_2$-group; and (2) isolating the pigments.

9. Process of claim 8 wherein the treatment with the amine is carried out while stirring.

10. Process of claim 8 wherein the treatment with the amine is carried out while heating to temperatures of about 50–100° C.

11. Process of claim 8 wherein the pigment is in an aqueous alkaline dispersion in which it was prepared.

12. Process of claim 11 wherein the pigment is an azo dye.

13. Process of claim 8 wherein the pigments are subjected to the step (1) of contact with amine, then the mixture is acidified prior to the isolation step (2).

14. Process of claim 8 wherein the amine is N-cyclohexylpropylenediamine-(1,3).

15. Pigment prepared by the process of claim 8.

16. The process of claim 8 wherein the pigment is an azo dye.

17. The process of claim 8 wherein the pigment is an anthraquinone dye.

18. The process of claim 8 wherein the pigment is a phthalocyanine dye.

19. The process of claim 8 wherein the pigment is a quinacridone dye.

References Cited

UNITED STATES PATENTS

| | | | |
|---|---|---|---|
| 2,867,540 | 1/1959 | Harris | 106—308N |
| 3,000,750 | 9/1961 | Felletschin | 106—308N |
| 3,147,131 | 9/1964 | Kingsbury | 106—308N |

JAMES E. POER, Primary Examiner